United States Patent [19]

Hoke et al.

[11] 4,354,352

[45] Oct. 19, 1982

[54] CATALYTIC COATING TO DIRECTLY GENERATE HEAT UPON THE SURFACE OF A HEAT DOME

[75] Inventors: John L. Hoke, Bethesda, Md.; Theodore W. Sudia, Washington, D.C.

[73] Assignee: The United States of America as represented by the Secretary of the Interior, Washington, D.C.

[21] Appl. No.: 254,318

[22] Filed: Apr. 15, 1981

[51] Int. Cl.³ .............................................. F02G 1/04
[52] U.S. Cl. ......................................... 60/517; 60/669
[58] Field of Search ................. 60/517, 669, 650, 682, 60/524; 122/4 D

[56] References Cited

U.S. PATENT DOCUMENTS

| | | | |
|---|---|---|---|
| 2,616,672 | 11/1952 | Lambeek | 60/517 |
| 2,778,610 | 1/1957 | Bruegger | 122/4 D |
| 2,878,789 | 3/1959 | Huet | 122/4 D |
| 3,223,081 | 12/1965 | Hunt | 431/268 |
| 3,397,533 | 8/1968 | Steiner | 60/524 |
| 3,760,592 | 9/1973 | Neelen | 60/517 |
| 3,871,179 | 3/1975 | Bland | 60/526 |
| 3,955,556 | 5/1976 | Pangborn | 431/268 |
| 3,956,892 | 5/1976 | Nystrom | 60/517 |
| 3,996,745 | 12/1976 | Davoud et al. | 60/517 |
| 4,285,665 | 8/1981 | Enga | 60/517 |

OTHER PUBLICATIONS

D.O.E. Report #DOE/NASA/1040-80/13 by Tomazic, published 4/18/1980.
D.O.E. Report #DOE/NASA/51040-36 published 2/26/82.

*Primary Examiner*—H. Jay Spiegel
*Attorney, Agent, or Firm*—Thomas Zack; Donald A. Gardiner

[57] ABSTRACT

The use of a catalytic coating which acts to combine both the heat source and heat-transfer mechanism for a working fluid, such as that used in an external combustion engine. Maximum heat exchange is accomplished by the direct bonding of the coating, per se, to the engine head with a compound of catalytic agents which confines heat of combustion directly thereto. The preferred embodiment of the engine head surface may be finned or otherwise enlarged to provide for an increased surface area necessary for the heating of the engine head. This means of surface combustion results in a highly fuel-efficient engine and/or heat source with very low exhaust pollutants.

9 Claims, 6 Drawing Figures

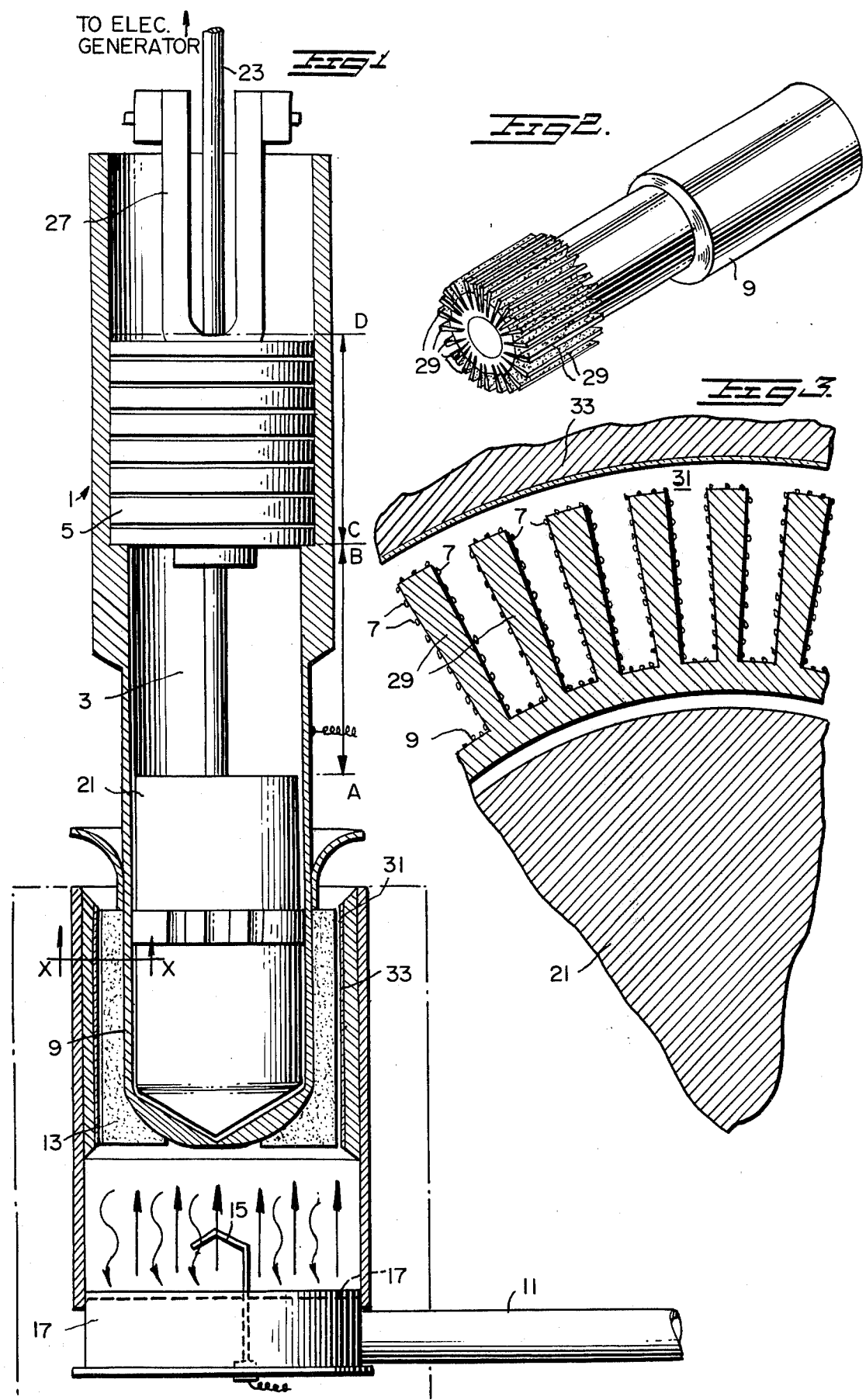

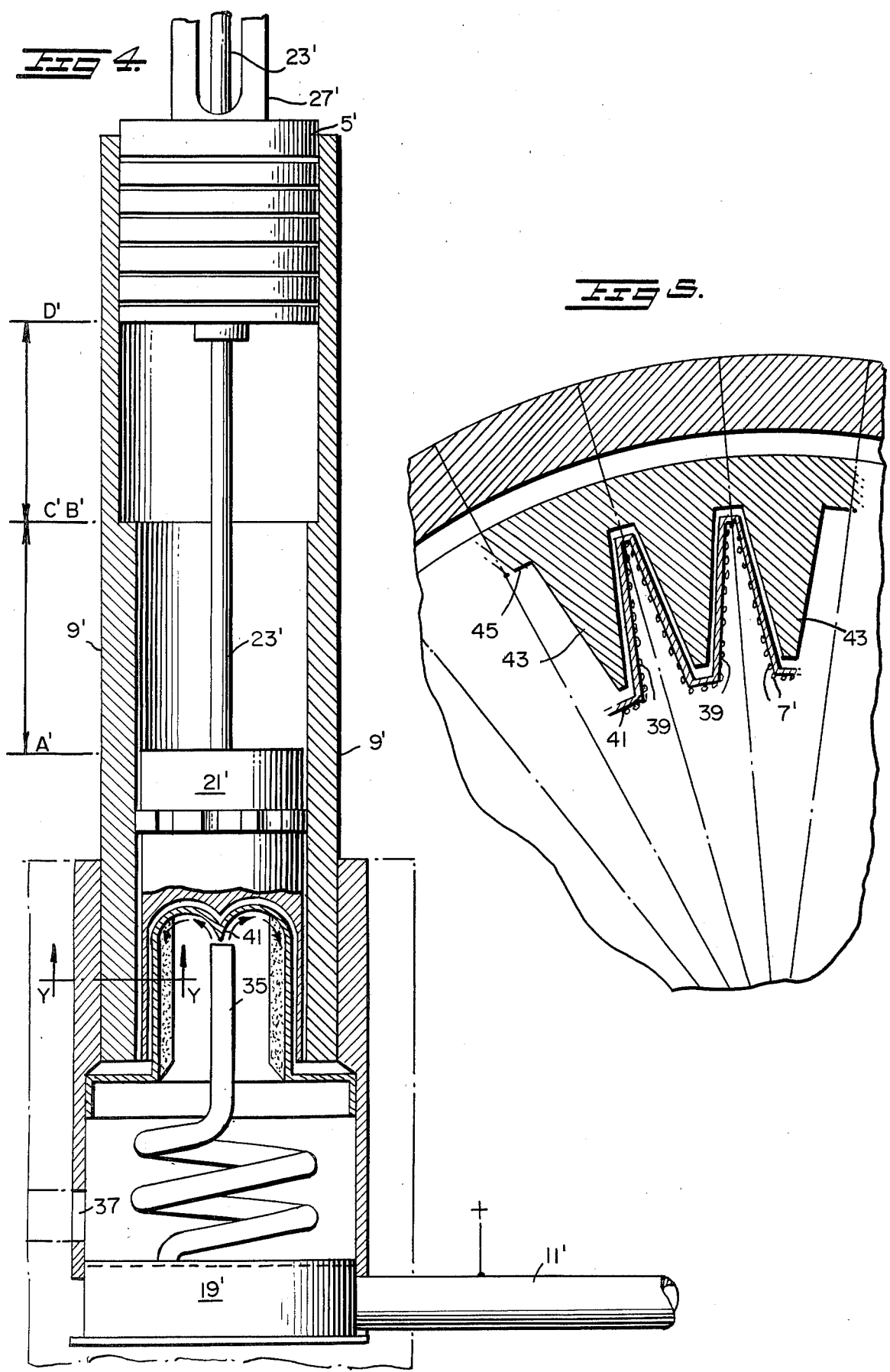

CATALYTIC COATING TO DIRECTLY GENERATE HEAT UPON THE SURFACE OF A HEAT DOME

BACKGROUND OF THE INVENTION

1. Field of the Invention

The invention disclosed herein is the improved utilization of catalytic materials suitable for use as the flameless heat source for powering an external-combustion engine or for transferring heat to any working fluid.

2. Description of the Prior Art

In many types of heat transfer devices a combustible fuel is employed and its heat of combustion is transferred to a working fluid. A common type in widespread current use employs an open plasma flame as the transfer medium. Another type employs a flameless combustion process by utilizing catalytic coatings at the surface area where heat is to be applied. Our invention relates to the latter type of heat transfer devices which may be exemplified by the U.S. Pat. Nos. 3,223,081 (E. B. Hunt) and 3,955,556 (J. B. Pangborn et al). In both patents, a catalytic material is used with a combustible fuel to provide for its combustion thereat and the catalytic material is in contact with a metallic surface which separates it from the working fluid which is to be heated. Two screens support the material having a catalyst thereon in the Hunt invention so that it contacts a metal case 4 which case in turn has the heat transfer liquid 8 on its other side. The Pangborn reference discloses the catalytic material in the form of a substrate liner or sleeve less than 1 mil thick (see column 5, lines 1-44). This thin sleeve contacts the metal chamber walls which walls are in direct contact with the fluid to be heated. This three layer system would thus have the catalytic material next to the metal wall which is, in turn, next to the working fluid to be heated.

What the prior art fails to disclose, and we disclose in our preferred embodiment, is the use of a catalytic material which is bonded directly on the surface whose opposite side has the working fluid into which the heat is to be transferred. We thereby eliminate the supporting substrate for the catalytic material. By directly applying the catalytic material and selecting a surface area of the desired size and shape, we have been able to very effectively transfer heat from the engine head of an external combustion engine to its working fluid. This has resulted in a very fuel efficient engine that is low in emission pollutants. Other heat transfer uses, such as heating water in a water heater, are also contemplated.

SUMMARY OF THE INVENTION

The invention disclosed and claimed herein relates to the use of a catalytic material bonded directly on a surface to provide for a target zone which could be the heat dome of an internal combustion engine. At this target zone, flameless combustion takes place as a combustible fuel is introduced. In this way the produced heat is transferred to a working fluid on the opposite of the surface from the target zone. This heated working fluid can then be used to do mechanical work which in turn can produce electricity. In one of its most basic uses, the working fluid may be the desired end product itself such as the hot water in a hot water heater or steam engine.

The primary object of this invention is to provide for the bonding of a catalytic material directly on a heat dome surface which is in contact with a working fluid.

DESCRIPTION OF THE DRAWINGS

FIG. 1 illustrates a sectional view of one use for one embodiment of this invention.

FIG. 2 shows the preferred embodiment for the engine head embodying our invention.

FIG. 3 is an enlarged partial sectional view of the engine head taken along lines X—X of FIG. 1 as it would appear when in an operative mode.

FIG. 4 is an alternate embodiment of the FIG. 1 engine which could be used with our invention.

FIG. 5 is an enlarged partial cross-sectional view taken along lines Y—Y of FIG. 4.

FIG. 1 schematically illustrates a conventional external combustion engine 1 in which a confined working fluid 3, such as air, is heated to do mechanical work. In this case, the fluid goes through cyclical expansion and contraction phases to drive a piston 5 such as it would in an Ericsson engine. Inherent in this system's efficiency is the accomplishment of the heat transfer from the heat source or heat dome to the internal working fluid with as few losses as possible, i.e., the conversion of the highest possible percentile of heat energy of combustion into mechanical work for the highest thermal efficiency of the engine. Flame plasmas usually result in much of the heat energy being exhausted with the combustion by-products. To avoid this consequence, we have decided to look at the highly efficient flameless combustion produced with catalytic materials. To improve this high thermal efficiency, we have bonded a catalytic material 7 directly on the outer surface 9 which forms the engine's heat dome or head. Thus, the catalyst is not bonded to or integrated with a material which is in turn in contact with the heat dome, but rather, it is bonded directly on the heat dome's surface. This insures the high heat transfer and thermal efficiency we seek with an almost infinite number of shapes and sizes for the heat dome.

Figure 6:
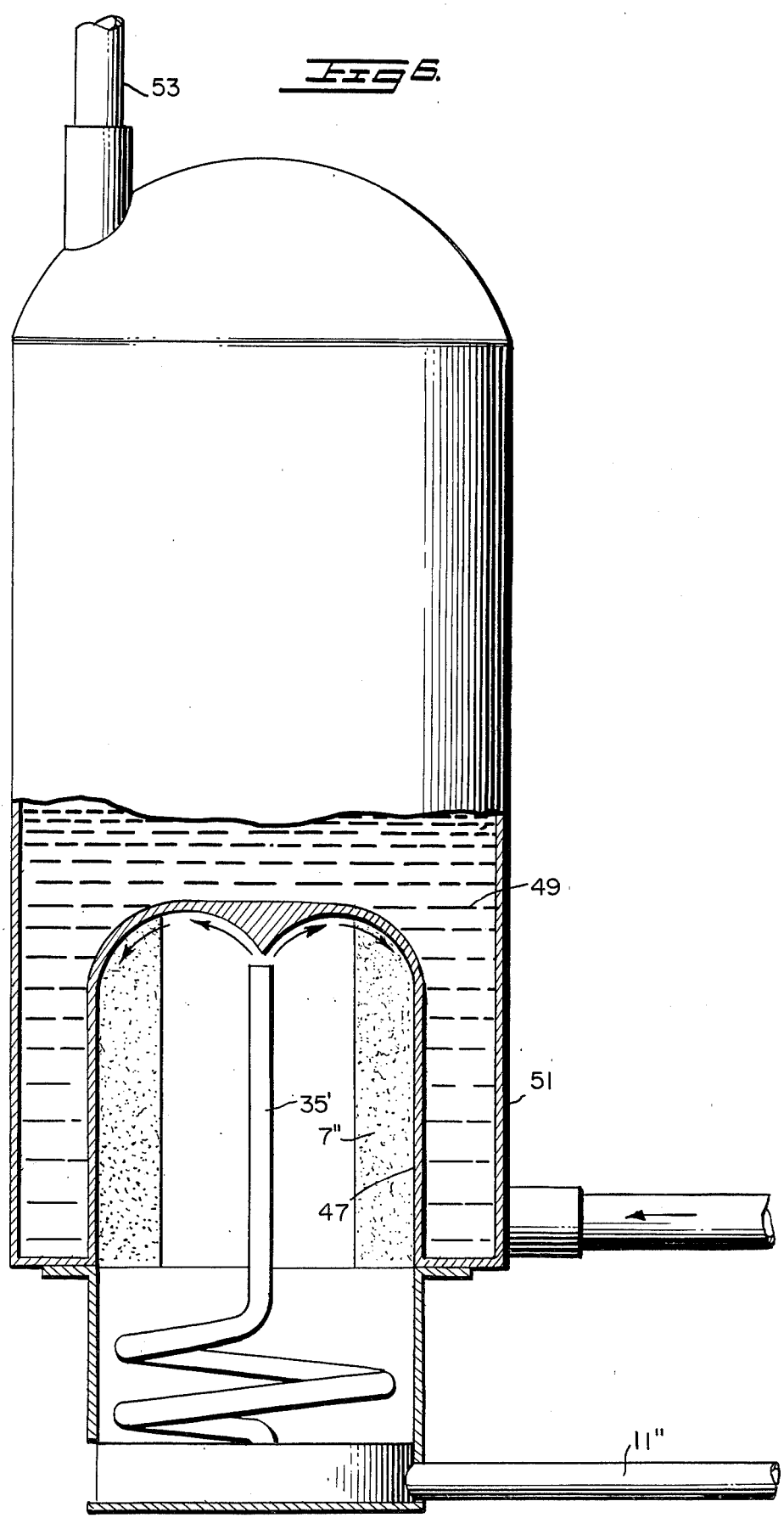
FIG. 6 illustrates still another embodiment of our invention in which hot water or steam is produced.

Again referring to FIG. 1, there is shown an inlet conduit 11 in which a gaseous stoichiometric fuel/air mixture enters until it reaches combustion chamber 13. Practically any type of combustible vapor-state fuel could be used, such as propane gas, natural gas, methane, etc., as long as it is properly mixed with air in right proportions and quantities. Within this chamber 13 the fuel is initially ignited. This may initially occur by self-ignited combustion, due to interaction with the catalyst (as would be the case with hydrogen) or an electric igniter 15 may be used to send a spark therefrom across the chamber to the surface 9. A piezoelectric crystal (not shown) may be manually actuated to obtain the spark. Appropriate flash back protection may be provided by protector 17 as well as within fuel feeder 19. Once such preignited fuel has elevated the temperature of the catalized surface sufficiently to support surface combustion, it will continue burning on the catalytic surface 7 as long as the fuel continues to be properly supplied in the right stoichiometric mixture to support the combustion. If existing flames do not self-extinguish, they may be blown out by external means, or the fuel-air mix arrested briefly to effect extinguishment of the latent flames. Our supply of fuel-air mix, combustion continues upon the catalytically-treated surface, now at the proper temperature level to sustain the combustion. Within the cylinder 9, whose outer forward surface has the catalyst bonded thereon, is a reciprocating displacer slug 21 having an elongated displacer rod 23 attached to it. This rod extends through a gland in the reciprocating piston 5 located at the rear end of the cylinder. The rod extending through the piston is connected to appropriate linkages, etc. to effect the necessary mechanical movement of the displacer. This movement can be effected by a rotating shaft which itself is driven by the power piston 5 which is in turn connected to an electric generator.

FIG. 2 is a perspective view of the FIG. 1 cylinder 9, by itself, used to show more of its detail. The front end of the cylinder has had cut into it a series of longitudinal, generally parallel, evenly-separated fins 29 which encircle the cylinder (when viewed from the front end) and run part way back. This particular geometric configuration was chosen to provide a greater surface area, than a smooth cylinder surface, on which to bond the catalytic material which forms the target heat zone. It is on this finned surfaced coated with the bonded catalytic material that flameless combustion occurs and which constitutes the heat dome. Depending on the design contraints involved, almost any infinite variety of different shaped surfaces could be employed as the target zone.

The enlarged partial sectional view, as viewed along lines X—X of FIG. 1, is depicted in FIG. 3. The fins 29 are milled into the cylinder 9 at its forward closed end. They thus are part of the cylinder, and function to support the catalytic material 7 bonded directly to it on the outside, and to confine the working fluid and movable displacer rod inside, as well as the drive piston that functions within the opposite open end of the cylinder. The empty space 31 between the separate fins and between the outer ends of the fins and the adjacent chamber wall 33, allow fuel-air movement between and around these fins, to support combustion and to permit exhaust to escape from the combustion chamber 13 as shown by the direction of the arrows.

In one working embodiment of this invention, the cylinder/heat dome head was made from stainless steel. This material would insure the desirable feature of a very high rate of heat conductivity through its walls from the combustion source to the confined working fluid, which in this example was air. Other candidate materials can be utilized as well, and so no limitation is implied by the use of stainless steel in the embodiment. The displacer slug 21 was made of aluminum and moved in predetermined mechanical phase with the rear piston and connecting rod 27. The letters A to B and C to D indicate the approximate stroke limits for the displacer and piston, respectively.

Mirrored reflection of radiant heat associated with this described burner embodiment, can be controlled by the location of reflective surfaces on the inner walls of shroud 33.

The FIG. 4 alternate embodiment is somewhat similar to the FIG. 1 embodiment. Elements performing the same function have been given the same number and primed. The essential differences between these two embodiments relate to the geometry of the front end of cylinder 9' and the placement of the bonded catalyst 7'; the use of an internal burner 35, and the location of combustion exhaust port 37. The configuration of the cylinder's front end can best be shown in the sectional view of FIG. 5. In this embodiment the catalytic material 7' is bonded to the internal surface of frusto-pyramid shaped projections 39 and also the smooth surface 41. Complementary shaped projections 43 face towards the surfaces 39 and are separated by a small space therefrom. The shaped projections 43 resemble a female "spline", whose purpose, working within the contained working fluid of the engine, is to effect the complete transfer of working fluid from the chamber formed by the adjacent wall 41. The "spline" 43 is an extension added to the nearest face of the displacer piston 21', or can be directly milled from bar stock such as to render a single assembly of displacer piston 21' and the spine fins 43. By utilization of close tolerances, the reciprocal advancing and withdrawings of the combined displacer piston and splined fin assembly (21' and 43, respectively), assure the complete transfer of the surrounding engine working fluid from the two extremes of adjacency with the walls of heat exchange surface 41, to relocation to the rear of cylinder 9' that exists between the rear of the displacer piston 21' and the front face of the drive piston 5'. Variations in this means of creating added surface area on the "outer", catalytically-treated heat transfer wall 41 are also envisioned; in the case of each such variation, the complimentary displacer interface function being designed to effect the same close-fitting relationship with the adjacent inner wall of 41, so as to always effect a minimum of "dead space" wherein working fluid might remain unaffected by the cyclical transfer function of the displacer piston assembly 21' and any added structures to accommodate close interface with the adjacent surface of burner wall 41.

In similar function to the earlier described fuel-air administration, a stoichiometric mixture of fuel and air is fed into input 11', and through firebox base 19', and exiting in a skewed flow from the end of tube 35, such as to evenly flow through and around the catalytically-treated surfaces of the adjacent involuted heat dome 14. Combustion can be initially begun by spark ignition (where self-ignition is precluded by the use of fuels requiring pre-ignition), wherein tube 35, being electrically isolated from the surrounding structures, can exit a spark from its tip nearest to the wall 41. Following ignition, similar functions as described for the earlier mentioned engine configuration are effected in this embodiment. The use of the involuted burner configuration shown in FIG. 4, enables the elimination of radiant losses that can be associated with the earlier-described burner assembly. Latent heat, within the chamber formed by 9' and adjacent walls, imparts some of its heat into inflow tube 35, thus recapturing heat that would otherwise be loosened into the exhaust, through ports 37.

FIG. 6 is still another embodiment of our invention in which it is applied to heat water. The actual output can be hot water or steam depending on the result desired. In this embodiment, the internal burner 35' is used to combust the fuel entering via conduit 11". Flameless combustion occurs, as described before re FIG. 4, on the catalytic coating 7" which is bonded to the interior surface of wall 47. The water 49 to be heated is confined to vessel 51 until heated and exhausted through outlet 53. Structural shapes in the burner wall similar to but not limited to those described with respect to FIGS. 4 and 5, can be employed to effect enhanced heat transfer, and to encourage enhanced thermal syphoning functions, at the interface of the working fluid and the adjacent heat transfer wall 47.

The actual process of bonding the material to the heat dome surface and the actual catalytic material used in our working embodiments are proprietary to the Met- Pro Corporation (OXY-Catalyst) of Harleysville, Pa.; however, our invention contemplates many types of catalytic materials such as platinum/rhodium alloys containing from 10–30% rhodium among others that could be used. We contemplate that this invention could be used in any type of external combustion engine employing a confined working fluid including, but not limited to, Stirling engines, Rankine engines, steam engine systems, etc. The details of the engine are of no consequence to our invention as long as there is a confined working fluid which is heated to do mechanical work at its output. Further, the output may be used to directly run a fuel powered automobile, to run an electric generator which in turn runs an electric powered automobile, or serves to recharge its batteries, while underway, or it simply may be an intermediate stage which provides a heated fluid to the next stage for some desired result. Whatever the use made of the heated working fluid, it should be clear that our invention accomplishes the heat transfer involved with a very high thermal efficiency and with low exhaust pollutants. All of these variations and other variants obvious to those skilled in the heat transfer art are to be included in the scope and spirit of our invention which is to be limited only by the claims that follow.

We claim:

1. A method of transferring heat energy from a heat source to a confined working fluid of an external combustion engine comprising the steps of:
    (a) supplying a combustible fuel in stoichiometric preparation to an engine's combustion chamber having a heat dome with catalytic material bonded directly on its external surface, said dome acting to confine and being in direct physical contact with the working fluid to be heated;
    (b) providing for the flameless combustion of the fuel on the catalytic surface to effect the direct transfer of heat energy through the dome's material to the confined working fluid located in direct physical contact with the material constituting the internal surface of the heat dome; and
    (c) utilizing mechanical means to receive a work output from the heated working fluid.

2. The method of claim 1 including the additional step (d) of controlling the supply of fuel to the combustion chamber thereby regulate the heat of flameless combustion on the catalytic surface and the amount of heat energy supplied to the working fluid which in turn controls the amount of mechanical work outputted from the engine in step (c).

3. An external combustion engine having a confined working fluid comprising:
    a heat dome in direct physical contact with the working fluid on its interior surface, said dome providing the material to confine the fluid therein and having catalytic material bonded directly to the opposite surface of the material which confines the working fluid;
    means for confining and supplying a combustible fuel mixture to the dome's catalytic material to provide for its flameless combustion thereon and the direct transmission of the resulting heat energy into the working fluid through the dome's material; and
    mechanical output means movable by the working fluid.

4. The engine of claim 3 wherein:
    said heat dome is constructed to include a plurality of fins on which the catalytic material is bonded; and
    said means for confining and supplying a combustible fuel has a combustion chamber which confines and combusts the fuel therein to the catalytically treated surface region near the heat dome, said chamber having an exhaust port to allow combusted results to be exhausted.

5. The engine of claim 4 wherein the fins of the heat dome are elongated and encircle the dome, said dome being the front closed portion of a cylinder containing the working fluid.

6. The engine of claim 5 wherein the mechanical output means comprises within a cylinder a movable displacer and drive piston which reciprocate therein, said piston being caused to move by pressure differentials of the working fluid whereby a mechanical motion is outputted.

7. The engine of claim 6 also including an electric generator responsive to the mechanical motion of the displacer, whereby electric energy is produced by the engine.

8. The engine of claim 3 also including means for controlling the fuel and air supplied to the catalytic material whereby the amount of heat energy supplied to the working fluid may be controlled and the amount of mechanical energy outputted by the mechanical output means from the engine regulated.

9. The engine of claim 3 wherein said catalytic material is directly bonded to the heat dome without mixing it with any other material.

* * * * *

UNITED STATES PATENT AND TRADEMARK OFFICE
CERTIFICATE OF CORRECTION

PATENT NO. : 4,354,352

DATED : October 19, 1982

INVENTOR(S) : John L. Hoke and Theodore W. Sudia

It is certified that error appears in the above-identified patent and that said Letters Patent are hereby corrected as shown below:

On line 56 in column 1, change "internal" to --external--.

On line 32 in column 5 of claim 1, change "preparation" to --proportion--.

Signed and Sealed this

Seventeenth Day of May 1983

[SEAL]

Attest:

DONALD J. QUIGG

Attesting Officer     Acting Commissioner of Patents and Trademarks